US008997149B1

(12) United States Patent
Allen

(10) Patent No.: US 8,997,149 B1
(45) Date of Patent: Mar. 31, 2015

(54) CONTEXT-SENSITIVE INTERACTIVE TELEVISION TICKER

(75) Inventor: Paul G. Allen, Mercer Island, WA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 0 days.

(21) Appl. No.: 13/591,052

(22) Filed: Aug. 21, 2012

Related U.S. Application Data

(62) Division of application No. 12/853,420, filed on Aug. 10, 2010, now Pat. No. 8,250,603, which is a division of application No. 10/261,075, filed on Sep. 30, 2002, now Pat. No. 7,774,815.

(51) Int. Cl.
H04N 5/445 (2011.01)
H04N 21/238 (2011.01)

(52) U.S. Cl.
CPC .................................. *H04N 21/238* (2013.01)
USPC ................... 725/40; 725/42; 725/46; 725/80

(58) Field of Classification Search
USPC ........................................ 725/40, 46, 42, 80
See application file for complete search history.

(56) References Cited

U.S. PATENT DOCUMENTS

2004/0003402 A1* 1/2004 McKenna, Jr. .................. 725/46

* cited by examiner

*Primary Examiner* — Jivka Rabovianski
(74) *Attorney, Agent, or Firm* — Troy A. Van Aacken

(57) ABSTRACT

An in-context interactive television ticker is provided. The ticker is rendered on a display screen that also shows a television program, and presents ticker content that is in-context with subject matter of the television program. The ticker remains rendered and context-sensitive to the subject matter of the currently shown television program, whenever there is a change in the television program, such as when the subject matter of the current television program changes, when a commercial interruption occurs during the television program, or when the television channel is changed. The ticker is interactive in that the viewer can perform various interactive operations with the ticker, including interacting with the ticker to obtain additional information related to an in-context item presented by the ticker.

19 Claims, 6 Drawing Sheets

CONTEXT-SENSITIVE INTERACTIVE TELEVISION TICKER

CROSS REFERENCE TO RELATED APPLICATION

This application claims priority as a divisional application of co-pending U.S. patent application Ser. No. 12/853,420, entitled "Context-Sensitive Interactive Television Ticker," filed Aug. 10, 2010, which is a divisional of U.S. patent application Ser. No. 10/261,075, entitled "Context-Sensitive Interactive Television Ticker," filed Sep. 30, 2002, now U.S. Pat. No. 7,774,815, issued on Aug. 10, 2010, each of which is hereby incorporated by reference in its entirety.

BACKGROUND OF THE INVENTION

1. Field of the Invention

This disclosure relates generally to presentation of information on a display device, and in particular but not exclusively, relates to an interactive television "ticker" for presenting content that is context-sensitive to subject matter of a concurrently shown television program.

2. Description of the Related Art

It is relatively common to see television programs accompanied by a scrolling "ticker." The term "ticker" derives from the fact that information in the ticker scrolls sequentially across the bottom of a television screen in a manner analogous to a stock market ticker tape. However, instead of simply including stock market information, current tickers carry a wide variety of other types of information. For instance, tickers that are present on sports channels typically scroll game scores or game schedules. Tickers that are present on news channels scroll the latest headlines, weather reports, or brief news updates.

Tickers are generally encoded in the same analog or digital signal as the television signal. For instance, with Motion Pictures Experts Group (MPEG) digital encoding, the ticker information is included along with the MPEG stream. A graphics generator or other mechanism generates the ticker information at a production studio (or other location) and then combines the ticker information with the television signal. The television signal is then broadcast to viewers. Obviously, with this current implementation, viewers have no control over the content, format, layout, or other presentation aspect of the ticker on their television (including whether or not to even display the ticker), since the production studio maintains such control and since the ticker is integrated with the received television signal.

An effect of this lack of control is that when the viewer changes from a first television channel (having a ticker) to a second television channel, the ticker disappears. This is because the ticker was encoded with the television signal for the first channel and was not encoded in the television signal for the second channel. Thus, while some current tickers do scroll information that is in-context with the subject matter of the currently shown television program, this in-context correlation was generated at the production studio, where a producer knows ahead of time the subject matter of the television program to be broadcast and therefore tailors the information to be scrolled by the ticker according to that subject matter. This in-context correlation is completely lost when the viewer changes the television channel or when the television program is interrupted by regularly scheduled commercials.

Because of the lack of viewer control over the operation of these tickers and over the content that they provide, such tickers are "non-interactive." The static and predetermined nature of these non-interactive tickers makes them unsuitable for interactive television environments. With interactive television, viewers can access interactive content and services that are generally unavailable through conventional television. The "interactive" viewing experience allows viewers to interact with content and services typically with the push of a button, in a manner not allowed by conventional television. Non-interactive tickers that lose their context or completely disappear when the viewer changes television channels or when there are changes in the television program will cause much viewer aggravation and detract from the interactive viewing experience.

BRIEF DESCRIPTION OF THE SEVERAL VIEWS OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Figure 1:
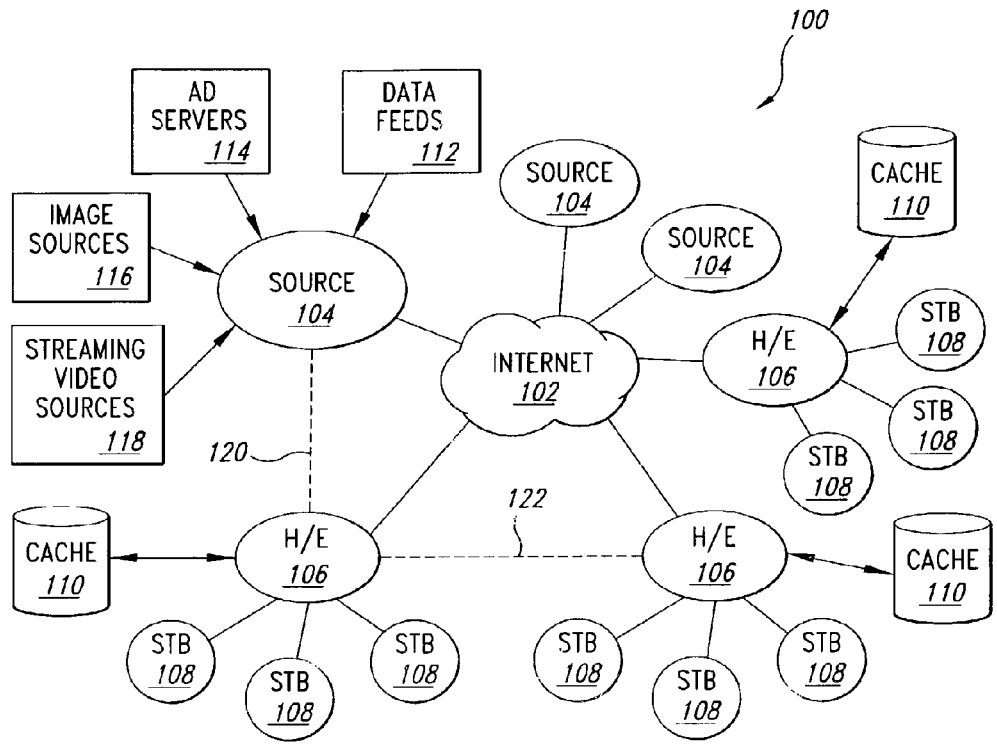
FIG. 1 is a block diagram of an example interactive video casting system that can implement a context-sensitive ticker in accordance with an embodiment of the invention.

Embodiments of techniques to provide a context-sensitive ticker are described herein. In the following description, numerous specific details are given to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, an embodiment of the invention provides a ticker that is context-sensitive to subject matter of a video program that is concurrently being presented along with the ticker. This context-sensitivity to the subject matter of the video program can be based on the video program's content and/or based on the television network that airs the video program. Thus, as an example, if the video program involves a basketball game, the ticker can present items related to the players (or teams) in that game, as such players appear in the video program. Alternatively or in addition as an example, if the basketball game is being shown on a sports television network, the ticker can scroll items related to subject matter of various sports programming shown on that network.

In one embodiment, when another video program interrupts the current video program, such as when a commercial break occurs or when the viewer changes the television channel, the ticker can remain rendered and continue to present items that are context-sensitive to the new video program. Thus, the ticker can remain rendered and not lose its context-sensitivity whenever the video program changes. Such context-sensitivity may be accomplished by correlating ticker content with television program information, such as information available from triggers, electronic program guides (EPGs), close-captioning data, or other suitable data.

An embodiment of the invention further provides the context-sensitive ticker with interactivity. For example, the viewer may be watching a basketball game and concurrently viewing in-context basketball ticker items. The viewer may then select one of the ticker items to view additional information related to that ticker item, such as detailed statistics, video highlights, news stories, advertisements, or links to other information. An embodiment of the context-sensitive ticker may be implemented in an interactive television system that provides video and interactive information to display devices, including televisions, wireless devices, and the like.

The term "ticker" as used herein is intended to generally describe a presentation of information on a display screen, such as a display screen for a television, and is not intended to be limited solely to implementations where the information is presented in a manner to exactly mimic a stock market ticker. In one embodiment, the ticker can comprise text and graphics that are scrolled or otherwise presented in a region of the display screen, along with a television image (such as an image from a live broadcast or from a recorded program). Various embodiments will be described herein in the context of "scrolling" the ticker information. It is to be appreciated that the term "scrolling" is merely illustrative of a technique to present dynamic ticker information, and that this term, in some embodiments, can encompass implementations where the ticker information is presented via screen segments of information, text segments, one-line-at-a-time, one-sentence-at-a-time, one-word-at-a-time, and the like, rather than the traditional format of one-character-at-a-time typically associated with stock market tickers. Moreover, the term "scrolling" is used generically herein to refer not only to vertical movement from bottom to top, but also movement from right to left (often referred to as "crawl") or movement in other directions.

FIG. 1 shows an example of an interactive video casting system 100 for distributing ticker content, Internet content, and television content according to an embodiment of the invention. In accordance with an embodiment of the present invention, the system 100 can be integrated with a cable television distribution system to provide interactive television tickers. The system 100 includes an Internet 102, a plurality of content sources 104, a plurality of distribution centers (depicted as the head-ends or H/Es 106), and a plurality of client terminals 108 or other devices (depicted as set top boxes). In addition, a content source 104 is depicted as receiving data from data feeds 112, advertisement servers 114, image sources 116, and streaming video sources 118. The content source 104 may also receive content from a broadcast video source. For the sake of clarity and to avoid clutter, not all of these sources are shown in FIG. 1 for each content source 104.

The plurality of content sources 104 is coupled to the Internet 102. For example, a content source 104 may comprise a web site portal such as Go2Net.com™, or a news web site such as CNN.com™, or other types of sources. Each content source 104 may have various data feeds 112, servers 114, and sources 116/118 coupled to it.

Figure 2:
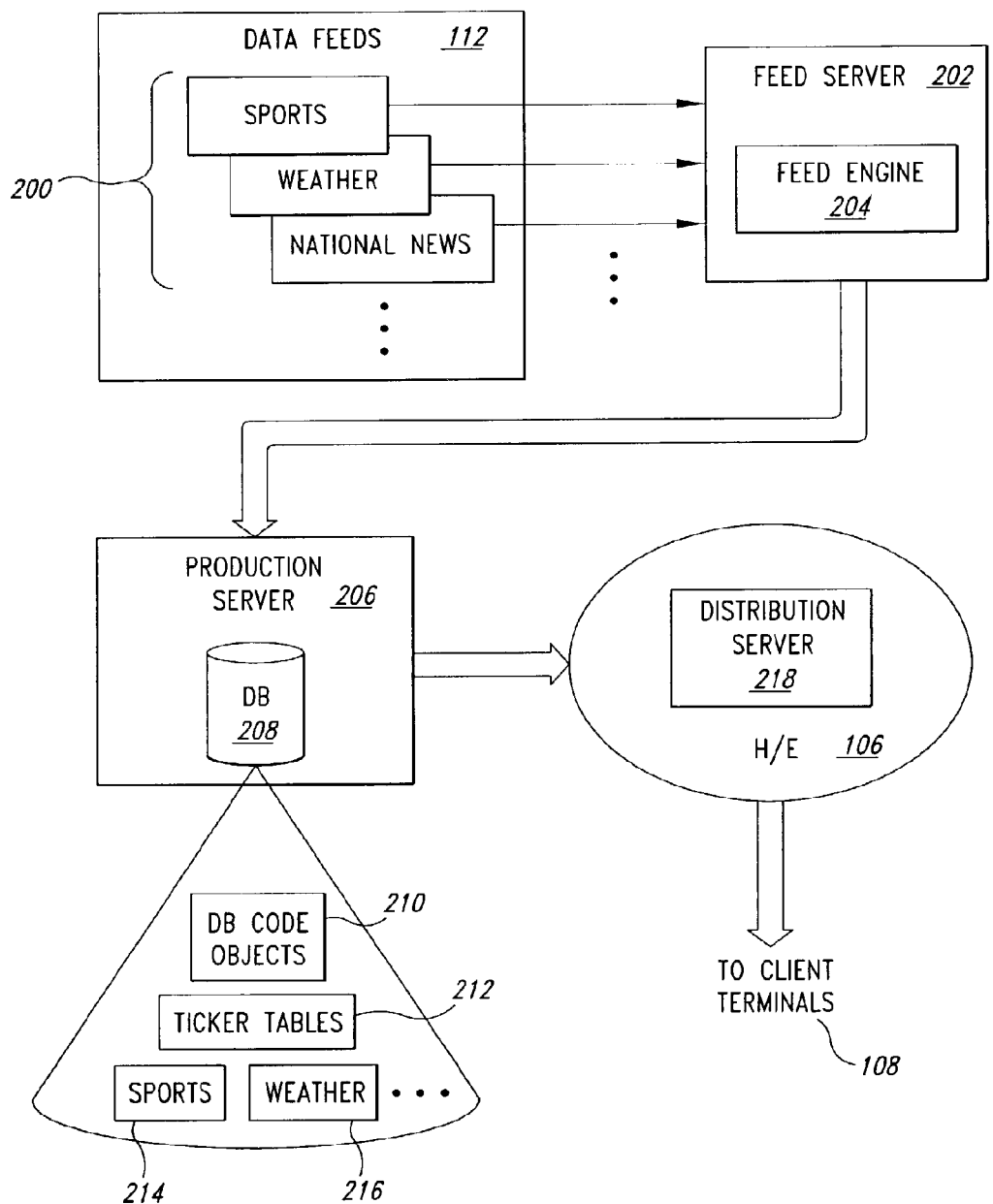
FIG. 2 is a block diagram illustrating example components that can be included in the system of FIG. 1 to provide a context-sensitive ticker in accordance with an embodiment of the invention.

For example, news or stock quote feeds 112 (including data for tickers) may be fed into the content source 104. Servers 114 may provide advertisements for insertion into multimedia content delivered by the content source 104 in accordance with one embodiment of the invention. Sources 116 and 118 may provide images 116, streaming video 118, and other content to the content source 104. Various other feeds, servers, and sources may also be coupled to the content source 104 of FIG. 1. An example configuration of components that can be integrated with the system 100 to provide ticker information to client terminals 108 is shown in FIG. 2.

The Internet 102 comprises a network of networks and is known in the art. Communications over the Internet 102 can be accomplished using standard protocols such as transmission control protocol/internet protocol (TCP/IP), hypertext transfer protocol (HTTP), file transfer protocol (FTP), or other protocols. Web sites, such as merchant web sites, can be included within or otherwise be in communication with the Internet 102. The Internet 102 is coupled to the plurality of distribution centers 106, and each distribution center 106 is in turn coupled to a plurality of client terminals 108, which may comprise a set top box, a PC, an interactive television set, or another type of communication device or display device.

In alternative or in addition to the Internet 102 being used to distribute multimedia content (including ticker data) from the content sources 104 to distribution centers 106, communications channels or networks 120 (which can include satellite delivery sources/networks) apart from the Internet 102 may couple one or more content sources 104 to one or more distribution centers 106. One example of such an alternate path for communications is illustrated by a first dashed line 120 in FIG. 1. Alternately or additionally, peering connections may exist between distribution centers 106. One example of such peering is illustrated by a second dashed line 122 in FIG. 1. Other communications configurations are also possible and are included within the scope of the present invention.

Caches 110 may be provided at (or otherwise coupled to) the distribution centers 106. Such caches 110 may be used to increase the performance in the delivery of multimedia content (including ticker data) to the client terminals 108. For example, larger files for video and other high bandwidth content may be stored in such caches 110, which may be closer-in-time to the client terminals 108 than to the content sources 104. In addition, reliability and guaranteed bandwidth may be provided because the Internet 102 is not in-between such caches 110 and the client terminals 108. In one embodiment, the caches 110 or other storage media in the system 100 can store ticker information, rather than or in addition to having such information buffered, cached, or otherwise stored at the client side.

In an embodiment, servers may be present in the distribution centers 106, with such servers including or being coupled to the caches 110 or other storage media. Alternatively or in addition, these servers may be located remotely from but still communicatively coupled to the distribution centers 106, via the Internet 102 or other communications channels or networks. Examples of such servers that can be used in connection with providing ticker information to client terminals 108 are shown in FIG. 2.

In accordance with one embodiment of the invention, different or multiple portals may be used to access the information provided through the interactive video casting systems of FIG. 1, based on the type of client terminal being used by the end user. That is, for example, a television portal may be provided for an end user that uses a television set coupled to the client terminal 108 to access the information. A PC portal may be provided for an end user that uses a PC to access the information. Portals can be provided for end users that use cellular telephones, personal digital assistants (PDAs), audio devices, and the like to access the interactive video casting system 100 of FIG. 1.

Such portals may be provided in several possible ways. In one embodiment, the client terminal (e.g., the end user's display device or audio device) can be suitably configured with an adapter that includes hardware and software. The adapter converts the television signals, the Internet or web page content, or other information provided from the interactive video casting system into a digitized format or other format that is compatible with the operational features of the particular client terminal 108.

In another embodiment, a cable service provider can deliver signals having different formats to the various client terminals 108, with the client terminals not necessarily having special adapters. Therefore, as an example, the cable service provider or other party can generate/deliver information (e.g., television programming, web page content, ticker information, and the like) having a format that is compatible for end users that receive the information via a television set. The cable service provider or other party can also generate/deliver the same information (e.g., simultaneously with the television portal on the same communication link, separately on a different communication link, on-demand independent of the television portal, and the like) using a format that is compatible with end users that receive the information via PCs, PDAs, cellular telephones, and the like. Thus, the term "interactive video casting system" is used to describe generally a system that can deliver video information and other information over any network and any network-compatible device by broadcasting, multicasting, or unicasting. An "interactive television system" is one type of or one means of access to an "interactive video casting system."

In one embodiment of the invention, content providers and/or broadcasters can be in partnership with a ticker provider (such as a multiple service provider or other interactive service provider) to use a standard content identification system. For example, the content providers can identify the subject matter of their video programs under a standard set of identifiers (IDs). The general category of "Sports" may be identified as ID #20, for instance. Certain sports types, teams, players, etc. may then be further identified, respectively, as ID #20A, #20A1, #20A1a, and so forth. Various ID numbering schemes are possible. Once the subject matter has been identified as such, the broadcasters can insert triggers or other mechanisms in their broadcasts that contain these identifiers in concert with the broadcasted video. Thus, when a basketball game is broadcast, certain frames or other portions of the broadcasted signal can be accompanied by the triggers that identify the subject matter (such as a player) appearing in those frames.

The ticker provider also uses the same or similar ID numbers for its ticker content. Thus, the ticker provider can correlate the IDs from the television broadcasts with the IDs of its available ticker content, to select and scroll in a ticker items that are in-context with the subject matter of tuned-to television broadcasts.

FIG. 2 is a block diagram illustrating example components that can be included in the system 100 of FIG. 1 to provide data for tickers in accordance with an embodiment of the invention. The data feeds 112 include a plurality of different ticker data feeds 200 that provide a variety of different topical data that can be displayed in a ticker. For instance, the different ticker data can include sports data, weather data, national news, and so forth. The sources that can provide this data can include entities such as Reuters™ The Sporting News™ (TSN), Associated Press™ (AP™), and others. In one embodiment, the ticker data from the data feeds 200 comprises "raw" unformatted data (e.g., data with minimal or no formatting or graphics).

The raw ticker data is provided to a feed server 202. In an embodiment, the feed server 202 operates as a content aggregator that pulls or otherwise receives the raw ticker data from the data feeds 200. The feed server 202 may also perform data manipulation on the received ticker data to manipulate the data into a database format so that the data can be indexed and stored. It is noted that data may be stored to a database 208 "as-is" (e.g., no data manipulation). For example, the complete extensible markup language (XML) data from a content provider (of the data feeds 112) can be stored in the database 208 (to be parsed downstream), without any data manipulation. Furthermore, there are available XML-based databases in which all data is stored in XML format. A feed engine 204, which can be embodied in software or other machine-readable instructions stored on one or more machine-readable media according to an embodiment, can reside and run in the feed server 202 to perform at least some of this data manipulation.

The feed server 202 is coupled to provide the manipulated ticker data to a production server 206. The production server 206 includes or is otherwise coupled to a database 208. The feed engine 204 calls on the database 208, and instructs the database 208 where to place the various ticker data. For example, the database 208 can include a plurality of database code objects 210 that cooperate with ticker tables 212 (such as a sports table 214, a weather table 216, and so forth) to index or store ticker data. The feed engine 204 calls the database 208 and identifies the database code objects and ticker tables where the ticker data is to be stored.

The various components of the database 208, such as the ticker tables 212, can also be configured in a manner that optimizes the organization and distribution of the ticker data. For example, ticker data unique to various geographic regions can be segregated from or otherwise identifiable from each other, so that ticker data that is relevant to only particular client terminals 108 need not be broadcast to all client terminals. For instance, California weather information can be segregated from Oregon weather information in the database 208 in a manner that client terminals 108 of California users do not receive Oregon weather information, unless specifically requested. This feature improves transmission efficiency and transmission time, since the bandwidth of communication paths to certain client terminals 108 are not clogged by non-relevant ticker data.

In an embodiment, the production server 206 can also perform data manipulation, such as before the data is stored in the database 208, while it is stored in the database 208, or after the data is retrieved from the database 208 for transmission to client terminals 108. For instance, the production server 206 can perform data manipulation to place the ticker data into a format that is "consumable" or otherwise compatible with operating software of the client terminals 108. For instance, the production server 206 can place the ticker data into formats such as hypertext markup language (HTML), extensible markup language (XML), or other suitable formats.

The production server 206 is coupled to provide ticker data from the database 208 to one or more distribution servers 218, which may be located in or otherwise communicatively coupled to a distribution center 106 (such as a head-end). The distribution server 218 operates to provide the ticker data to the client terminals 108 via several possible communication paths or channels, as will be described with reference to FIG. 3.

It is noted that in one embodiment, the database 208 or other intermediate data locations, including the feed server 202, may be bypassed during the flow of data. The data may also be pushed directly from the content providers as well. In some embodiments, the data may or may not be stored in the database 208 at all. The data may reside in memory, stored to disk in flat files, or otherwise cached. For purposes of simplicity of explanation, various embodiments will be described herein in the context of storing data in the database 208, and it is of course appreciated that the invention is not restricted to this implementation.

It is also noted that one embodiment may parse and/or search the ticker data on-demand at runtime, as opposed to being indexed in the database 208. Several implementations of data storage, routing, and processing are possible and within the scope of the invention.

In one embodiment, the ticker data (whether it is stored in the database 208 or stored in other locations or obtained directly from feeds or other sources) is tagged with IDs that specifically identify its subject matter, where these IDs are from the same standard IDs used by the content providers and broadcasters in their television broadcasts. Thus, the general ticker category of "Sports" may be similarly identified as ID #20, for instance. A certain sport, team, player, and other related ticker content (if available) may then be further similarly identified, respectively, as ID #20A, #20A1, #20A1a, and so forth, so as to match the standard identification system used by the content providers and broadcasters.

It is to be appreciated that the components shown in FIG. 2 are merely illustrative of the various components of one embodiment that can be used to provide ticker information. For example, other embodiments can use more or fewer servers, as well as different components, to perform the various operations. Moreover, the various servers and their components (such as the feed engine 204 and the database 208) can be distributed elsewhere in the system 100, instead of or in addition to the locations shown in FIG. 2. There may be multiple feed servers 202, production servers 206 and databases 208, distribution servers 218, and so on to account for load balancing, redundancy in case of outages or broken connections, and other factors that can affect distribution of ticker information.

Figure 3:
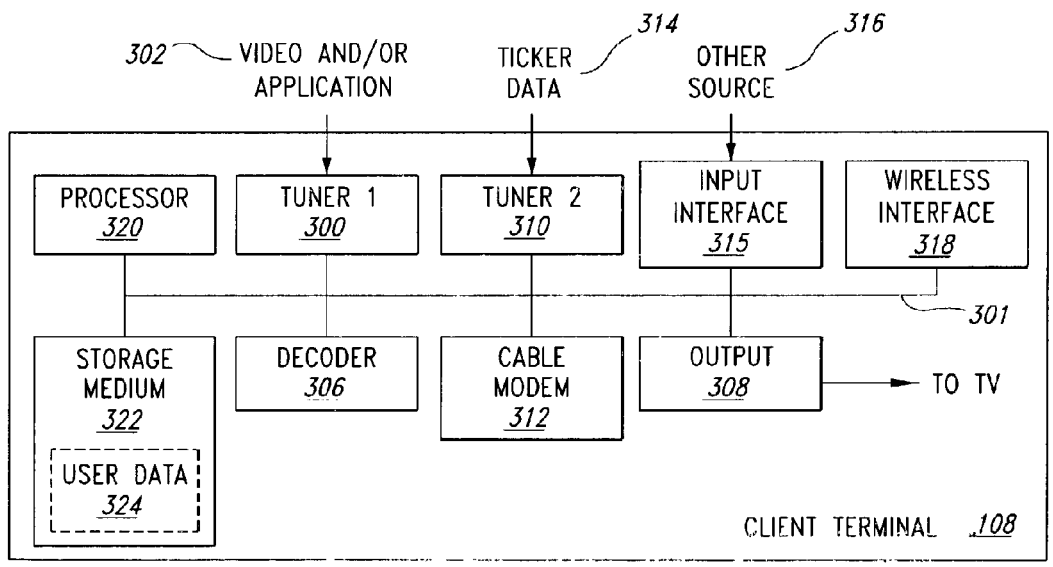
FIG. 3 is a block diagram of an embodiment of a client terminal that can be used in the system of FIG. 1 to present a context-sensitive ticker.

FIG. 3 is a block diagram of an embodiment of a client terminal 108 for the system 100 of FIG. 1 that can implement an embodiment of the invention to present a context-sensitive interactive ticker. For the sake of simplicity of illustration and explanation, only the components that are germane to understanding an embodiment of the invention are shown in FIG. 3. It is understood that the embodiment of the client terminal 108 shown in FIG. 3 can have other components different than or in addition to what is shown. Moreover, the various illustrated components may be suitably combined in some embodiments, instead of being separate. It also should be noted that the client terminal 108 is only one embodiment of the invention and that some or all of the components described as embodied in the client terminal 108 can be incorporated into a client television rather than in a separate device. A bus 301 is shown symbolically to depict coupling between the various components.

To briefly describe an embodiment, the client terminal 108 receives ticker data from the distribution server 218 or other sources, and then performs the appropriate processing of the data to allow the data to be displayed in a ticker on a display screen of a television set. The client terminal 108 can be passive in that it receives the ticker data (as well as updates) and when the data is sent by the distribution server 218, independently of whether the client terminal 108 requested the ticker data (e.g., the distribution server 218 "pushes" the data to client terminals 108). Alternatively or in addition, the client terminal 108 can poll or otherwise explicitly request the data from the distribution server 218, including polling the distribution server 218 for updated data (e.g., the client terminal 108 "pulls" the data from the distribution server 218). In some embodiments, both push and pull mechanisms may be involved.

Once it receives the ticker data from the distribution server 218, the data can be buffered or cached (if appropriate), and processed for presentation on the display screen of the television set. In an embodiment, ticker software in the client terminal 108 can work in conjunction with a ticker template or other ticker user interface to display the ticker (and its ticker items) in the appropriate scrolling layout, format, locations, time intervals, topics, content, and so forth. In one embodiment where the ticker data is obtained from the Internet 102, this ticker software can comprise browser-based software or other software capable to cooperate with a web browser. According to various embodiments, the ticker can be generated and made interactive through Flash, C++, Java, HTML, or other suitable code or software.

The client terminal 108 comprises a first tuner 300 to tune to a Moving Pictures Experts Group (MPEG) stream 302 or other video source. The stream 302 may include video, live transmission, and/or application code, including corresponding text and graphic resources. In an embodiment where tickers are provided in an integrated manner along with the video signal, the ticker can be received by way of the stream 302. One skilled in the art will recognize that there will be a plurality of streams 302, depending on the number of channels and programs that the cable service provider makes available to the client terminal 108.

The first tuner 300 is coupled to a decoder 306 that decodes the video, application, and/or audio into a format that is compatible with a television set coupled to the client terminal 108. The client terminal 108 may include a second tuner 310. The second tuner 310 can work in conjunction with a cable modem 312 to obtain ticker data 314 from the Internet 102, such as via a Data Over Cable Service Interface Specifications (DOCSIS) connection with the distribution server 218. In addition to the ticker data 314, Internet content can also be received by the client terminal 108 by way of the DOCSIS connection through the second tuner 310 and the cable modem 312.

In addition, the client terminal 108 includes or is coupled to an input interface 315, through which other sources 316 of ticker data can be provided to the client terminal 108. An example of the input interface 315 comprises an out-of-band tuner that can be used to tune to ticker data that is provided via an out-of-band channel. In an embodiment, the out-of-band channel(s) can comprise one or more low-bandwidth frequencies carried on the same coaxial cable used to provide the MPEG streams and the Internet content. The out-of-band channel(s) tuned to by the input interface 315 to receive ticker data can be used alternatively or in addition to the DOCSIS channel tuned to by the second tuner 310 in such an embodiment.

Further alternatively or in addition, the input interface 315 can comprise another television broadcast tuner (such as the first tuner 300) to tune to one or more channels that may be carrying ticker data. For example, ticker data (including updates) may be broadcast in one or more channel frequencies specifically dedicated for transmission of such data to client terminals 108. Thus, as an illustration, the first tuner 300 can tune to a channel showing a television program, while the input interface 315 is tuned to receive data (in the form of packets, for example) from a ticker channel to allow a ticker having context-sensitive information therein to be simultaneously shown on the same television screen as the television program.

Yet another example of the input interface 315 is an interface to receive outputs of recording devices such as a PVR or a digital video recorder (DVR) that may have ticker data, which may be received via download. Alternatively or in addition, the input interface 315 can comprise a communication interface, such as an Ethernet connection, a digital subscriber line modem, a wireless communication interface, and so forth, which can provide a link to the server 218 to receive ticker data and advertisements, for instance.

An embodiment of the client terminal 108 includes a processor 320 to control operation of the various components shown in FIG. 3. The processor 320 may work in conjunction with ticker software or other machine-readable instructions stored on at least one machine-readable storage medium 322. Such ticker software may cooperate with the processor 320 to present ticker data in a ticker template or other screen interface or user interface, configure the format and layout of the ticker displayed on the display screen of the television, correlate television program information with available context-sensitive ticker information, select and insert context-sensitive information into a ticker, process received user commands related to interaction with the ticker, and other operations. In an embodiment, the ticker software can be pre-installed in the client terminal 108. In another embodiment, the ticker software may be installed by way of download from the system 100.

An audio and video output subsection 308 of the client terminal 108 receives decoded video and/or other applications (including ticker templates and the ticker data presented therein), and provides the decoded information to a television set. A wireless interface 318 operates to receive commands from a user input device (such as a wireless remote control). Such commands can include user commands to interact with a context-sensitive ticker, in an embodiment. The wireless interface 318 provides these commands to the processor 320 so that the processor 320 can cooperate with the ticker software to perform the corresponding operation.

In an embodiment of the invention, the storage medium 322 can also store user data 324 related to operation of the ticker. For instance, the user data 324 can include various user configuration settings related to the context-sensitive ticker. In any of these storage locations, multiple sets of user data 324 may be stored, such as in implementations where multiple users in a household log into a same client terminal 108.

The storage medium 322 can include cache(s), buffer(s), or other types of storage locations where ticker data or other information may be stored. For example, received sports scores can be stored in the storage medium and retrieved during the appropriate times during the course of the scrolling of the ticker. The ticker data stored in the storage medium 322 can be replaced as updates are received from the distribution server 218. In one embodiment, less time-dependent ticker information (e.g., information that need not necessarily be updated several times per day), including graphics for weather displays, game schedules, some types of advertisements, and the like, can be downloaded to the storage medium 322 during non-peak television viewing periods (such as late at night), and then retrieved from the storage medium 322 when that piece of information is appropriate for presentation in the ticker.

Figure 4:
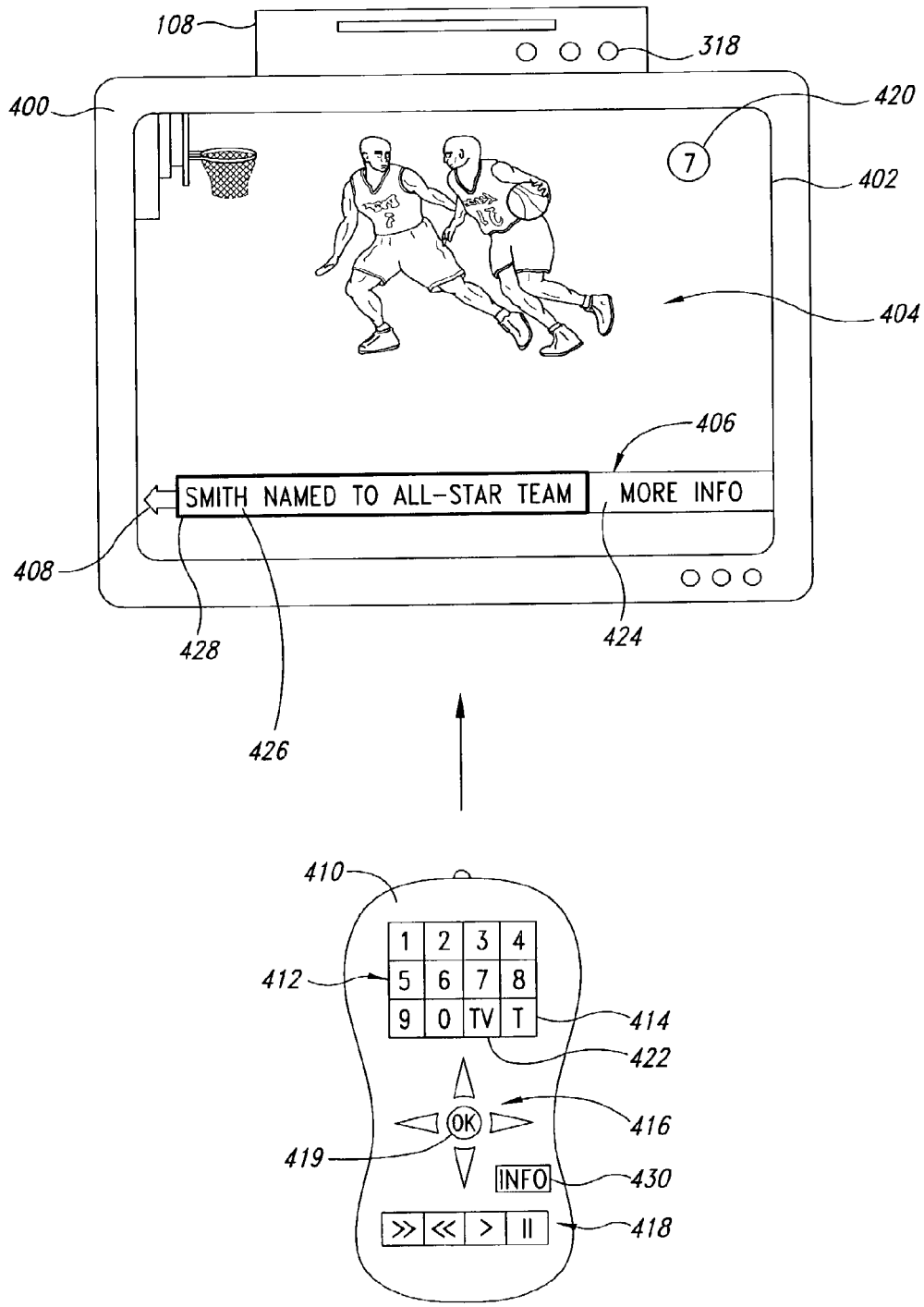
FIG. 4 is an example screen shot in conjunction with a remote control for implementing one embodiment of the invention.
Figure 5:
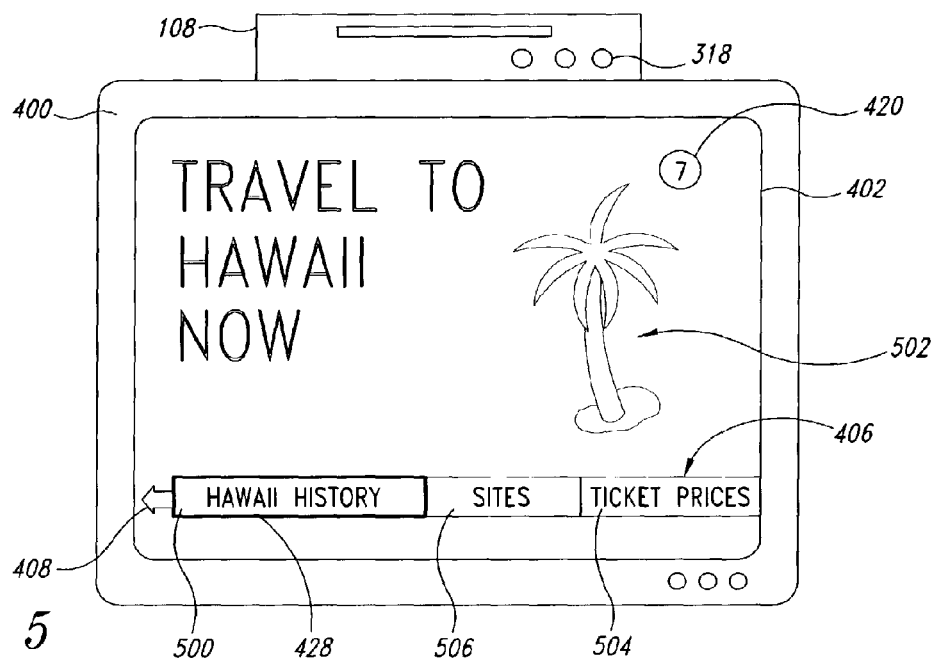
FIGS. 5-6 are additional screen shots depicting a context-sensitive ticker in accordance with various embodiments of the invention.
Figure 6:
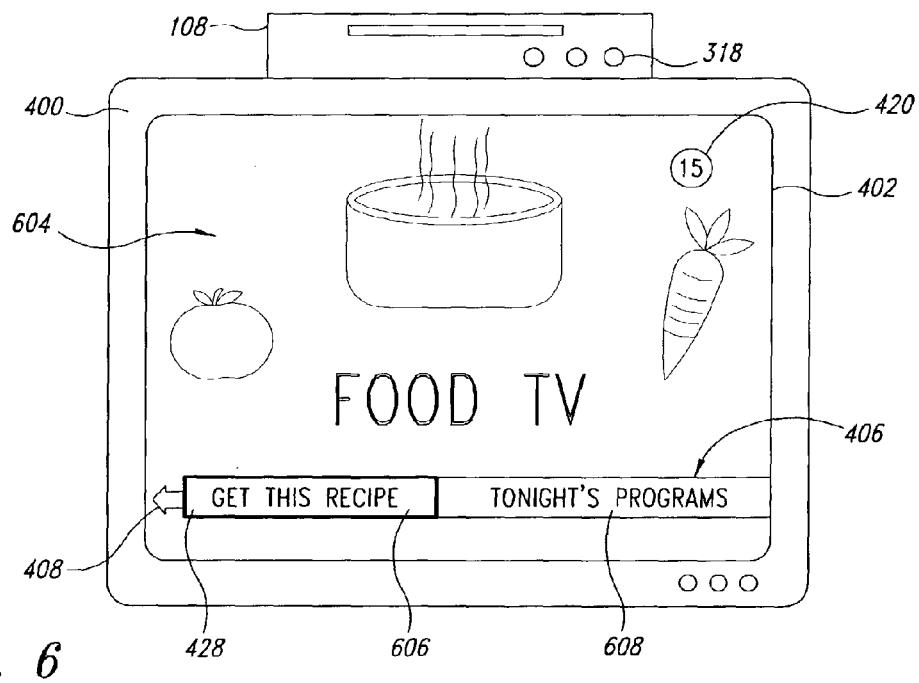

FIGS. 4-6 are television screen shots depicting operation of a context-sensitive interactive ticker or other similar interactive scrollable display in accordance with various embodiments of the invention. For simplicity of explanation, not all of the possible types of context-sensitive content and related ticker operations are shown or described, as such other possible information can be ascertained by examination of the features specifically shown in FIGS. 4-6. Moreover, it is to be appreciated that the format, layout, direction, content, and other characteristics of the ticker shown in FIGS. 4-6 are merely illustrative and that variations are possible.

In FIG. 4, a television set 400 is coupled to the client terminal 108 in a manner that allows a display screen 402 of the television set to show a television program 404. The television program 404 in this example is a basketball game, and it is understood that the television program 404 can include other types of video programs (including a television commercial). A channel indicator 420 indicates that the current channel is "Channel 7." A ticker 406 is shown scrolling across the bottom of the display screen 402. The ticker 406 can be in a screen interface that overlays the television program 404, or the television program 404 may be scaled appropriately on the display screen 402 to fit the screen interface for the ticker 406 and thereby avoid the need for an overlay.

In the example of the ticker 406, the ticker 406 is scrolling from right to left (as symbolically depicted by an arrow 408). It is to be appreciated that in other embodiments, the ticker 406 may be scrolling in different directions and may also be positioned differently on the display screen 402. A navigation control 428, such as a stationary center focus box into which scroll ticker items or a movable selection rectangle that can be moved within the scroll region of the ticker, can be used to make selections of items presented in the ticker 406.

A wireless remote control 410 is in communication with the client terminal 108 (via the wireless interface 318) to perform conventional television-viewing operations and also to control operation of the ticker 406 according to an embodiment of the invention, including viewer interaction involving selection of ticker items. The remote control 410 includes an alphanumeric keypad 412 and buttons 418 that are similar to play, rewind, fast forward, pause, etc. buttons. In an embodiment, the remote control 410 can include a ticker button 414, which if pressed, causes a command to be sent to the client terminal 108 to instruct the ticker software to render the ticker 406 on the display screen 402. If the ticker button 414 is pressed again, the ticker 406 is taken off the display screen 402. Alternatively or in addition, a TV button 422 can be pressed to dismiss the ticker 406.

In one embodiment, selection of items presented by the ticker 406 may be performed via arrow keys 416 that are used to control movement of the navigation control 428 (if it is a movable selection rectangle), followed by pressing an OK button 419 or an INFO button 430. In embodiments where the navigational control 428 is a stationary center focus box, the OK button 419 or the INFO button 430 can be pressed when the desired item scrolls into the center focus box.

FIG. 4 illustrates one embodiment of the invention where at least one item presented by the ticker 406 is directly related to or otherwise in-context with the television program 404. More specifically, assuming that the television program 404 is a Sonics basketball game, an item 426 can present a news story, headline, advertisement, link to detailed information or video, statistics, or other information that is context-sensitive to the subject matter of the television program 404 (e.g., a headline announcing that a Sonic player "Smith" has been named to an all-star team, in this example). In some situations, the item 426 is presented by the ticker 406 during specific instances that the player Smith actually appears in the televised Sonics basketball game (television program 404), or just generally whenever Sonics basketball games are televised. In both instances, the item 426 is context-sensitive to the television program 404 because it presents information about Smith that is directly related to the subject matter (basketball) of the television program 404. The item 426 can be presented within the scroll region of the ticker 406 in bold, in a different color (which may indicate a hyperlink or other link), accompanied with an icon, underlined, or via some other technique to alert the viewer that he can interact with the item 426 to perform a purchase.

When the item 426 scrolls into the center focus box 428, the viewer can then press the INFO button 430 or the OK button 419 on the remote control 410 so as to view additional details of the item 428, such as the full story. In one embodiment, responding to or otherwise interacting with the item 426 in this manner results in presentation of related additional item(s) 424 within the scroll region of the ticker 406 itself, or presented in other ways (such as in a pop-up window) on the display screen 402. The additional information 424 may be provided via a hyperlink or other link (which may include channel tuning), retrieval of content from storage locations, provided in a manner similar to providing other ticker items, or other suitable technique that would be familiar to those skilled in the art having the benefit of this disclosure.

In one embodiment, context sensitivity can be provided by using Advanced Television Enhancement Forum (ATVEF) triggers or other triggering mechanisms to correlate the subject matter of the television program 404 to available ticker content. For instance, identification (ID) information or other information can be placed in the vertical blanking interval (VBI) of signal the television program 404 in a manner that identifies the teams in the game, the type of sport, the location of the game, time of the game, the player(s) in particular video frames, and so forth. Such ID information can be extracted and processed, based on techniques familiar to those skilled in the art having the benefit of this disclosure, to identify and select context-sensitive ticker items, correlated to the same (or similar) ID information, to present in the ticker 406. In the example of FIG. 4, triggers from the signal of the television program 404 have been processed by software to select the item 426 (a news item) relating to one of the players involved in the basketball game.

Other techniques may be used to correlate the subject matter of the television program 404 to available ticker content. For instance, EPG data can be parsed and processed to determine the television program, subject matter, actors, and so forth that are being shown on a particular channel at a particular time. As another example, close-captioning data can also be parsed and processed to extract various identifying information about the subject matter of the television program, and then this identifying information is used to select from available ticker content. It is appreciated that in some situations, there may not be a "direct" correlation or match of subject matter of the television program and available ticker content. In such situations, one embodiment of the invention chooses the "closest" fit, as will be further described below.

FIG. 5 illustrates an example when the television program 404 (the basketball game) is interrupted by another television program 502, such as a commercial. As shown in FIG. 5, the television program 502 on the same "Channel 7" is a commercial advertising travel to Hawaii. The ticker 406 has detected this change in television programming, and has therefore started scrolling context-sensitive items related to Hawaii. That is, the ticker 406 has remained rendered, and has transitioned from scrolling basketball information to scrolling Hawaii information.

For example, the ticker 406 is now scrolling information related to Hawaiian history item(s) 500, sites of interest item(s) 506, ticket price item(s) 504, and so forth. When any of these items scroll into the center focus box 428, the viewer can press the INFO button 430 (or the OK button 419) to interact with the ticker. For example, when the ticket price item 504 scrolls into the center focus box 428, the viewer can select that item to view (within the ticker 406 itself or in a pop-up window) prices, advertisements from travel agencies, terms and conditions, or other travel-related information.

FIG. 6 illustrates an example when the viewer has tuned from "Channel 7" to "Channel 15," as indicated by the channel indicator 420. In this example, Channel 15 shows dramatically different program subject matter than Channel 7. That is, rather than showing sports programming, Channel 15 is a television network that shows programming related to food and cooking, such as a cooking program 604.

The ticker 406 has detected this change in television channels and has remain rendered. Moreover, the ticker 406 is now transitioned to scrolling context-sensitive information related to the cooking program 604. An item 606 is an interactive item prompting the viewer to obtain the recipe for the dish being prepared during the cooking program 604. When this item scrolls into the center focus box 428, the viewer can press the OK button 419 or the INFO button 430 on the remote control 410 to view the recipe. As before, the recipe may then be rendered within the scroll region of the ticker 406 itself or elsewhere, such as in a pop-up window.

One or more items 608 scrolled by the ticker 406 can include information about upcoming programming on Channel 15. The item(s) 608 may be related or unrelated to the cooking program 604, but in either case, the item(s) 608 are context-sensitive to subject matter of the television network (e.g., Channel 15).

In variations to the above illustrated examples, the ticker 406 may be a type of ticker that may be organized according to different categories, such as weather, sports, news, entertainment, and the like. When one of these categories is active, the ticker 406 scrolls items related to that category. Thus, the user may be watching a movie on a particular television channel, yet the ticker 406 is scrolling the latest sports scores under the sports category. In an embodiment, when the ticker 406 detects a trigger or other identification mechanism in the movie and recognizes that the trigger can be correlated to an available ticker item, then the ticker 406 interrupts the sports scores and presents the new ticker item. Thus, if a certain actor appears in the movie (along with a trigger that identifies the actor in the video frames), the ticker 406 detects that trigger and correlates that trigger with available ticker content related to that actor. The ticker 406 then interrupts its scrolling of sports scores, and scrolls a news item or other item related to that actor.

Figure 7:
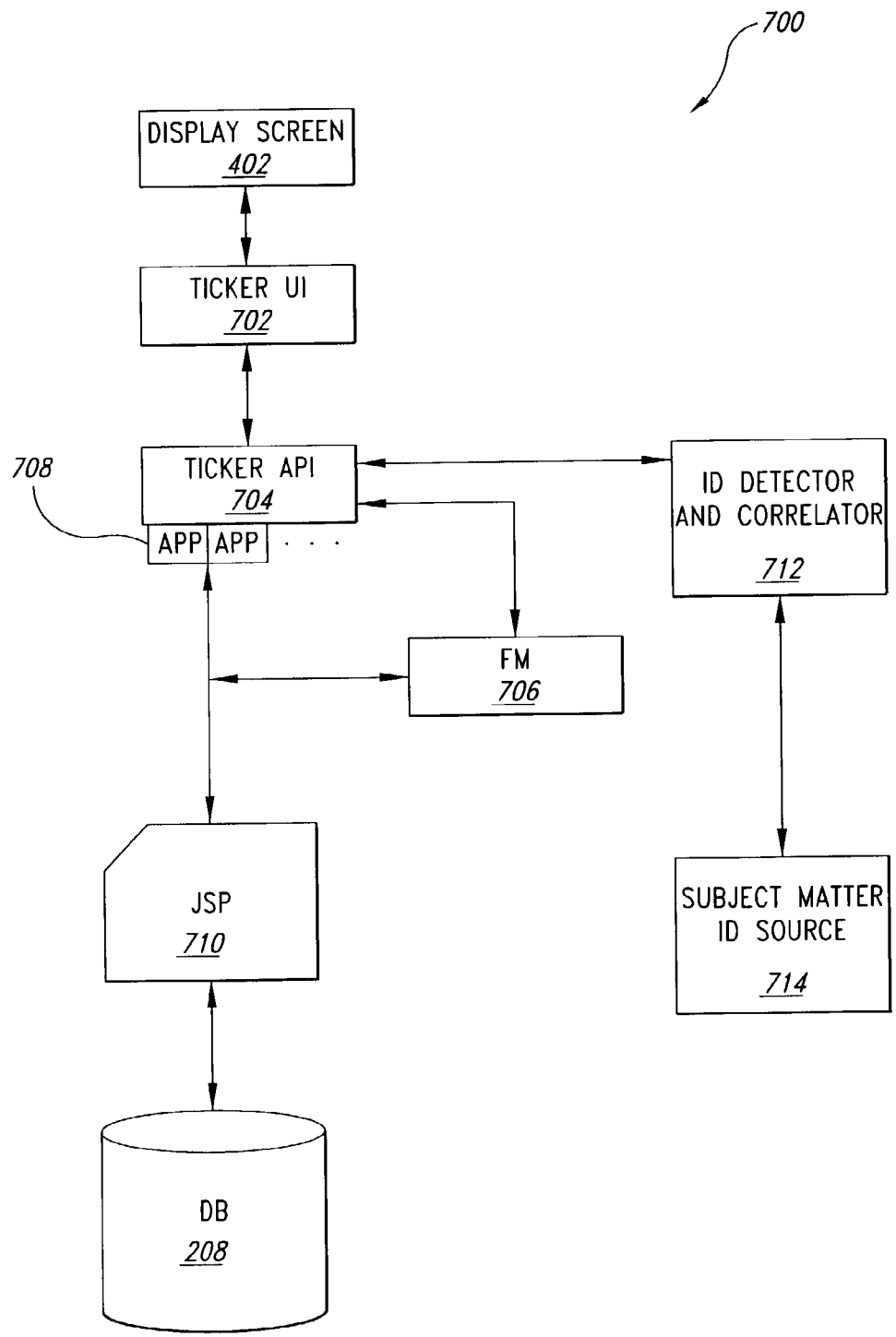
FIG. 7 is a block diagram illustrating components that can interact to present a context-sensitive ticker according to an embodiment of the invention.

FIG. 7 is a block diagram 700 illustrating components that can interact to present in-context items in the ticker 406 according to an embodiment of the invention. At least some of the components of FIG. 7 can be embodied in software or other machine-readable instruction stored on a machine-readable medium, such as the storage medium 322. An embodiment of the ticker software includes a ticker user interface (UI) 702 that presents the ticker 406 on the display screen 402, as well as being able to receive and process viewer responses. A ticker application program interface (API) 704 interacts with the ticker UI 702 to control what the ticker UI displays, how to display, when to display, and so forth. In an embodiment, the ticker API 704 provides in-context items to the ticker UI 702, as well as processing user commands that interact with the presented items (if necessary) and that are entered via the ticker UI 702.

The ticker API 704 interfaces with a plurality of applications 708. In embodiments of the ticker 406 where content is organized according to categories, these applications can include a sports application, news application, weather application, or other applications associated with categories. A feed manager (FM) 706 (or other software controller) operates to determine when new or updated ticker information is present and needs to be provided to the ticker API 704.

To generally describe operation of the ticker 406 in one example embodiment, the ticker API 704 logs and knows what the ticker 406 is displaying, and also knows how often the displayed information needs to be refreshed (based on business rules or other requirements present in functions defined in the ticker UI 702). In an embodiment, there may be rules in the ticker UI level that define when at least some of the in-context (or non-context) items are to be presented. For example, there may be viewer-configurable rules that specify that the ticker 406 should not present player statistics but should present news items related to a player, if that player appears in a television sports program or in a certain channel. If it is time for an update, the ticker API 704 (acting as a container of data) calls a load function that will cause the feed manager 706 to loop through the applications 708 to search for new data, and if there is new data, the feed manager 706 will pass the new data from the application(s) 708 to the ticker API 704 so that the ticker API 704 can pass the new data to the ticker UI 702.

In an alternative embodiment, the ticker API 704 manages the information that the ticker UI 702 will display, but it does not have knowledge of what the ticker UI 702 displays and when it is displayed. The ticker UI 702 invokes the lower level components via method calls to retrieve business objects. This means that the invocations of these lower levels are done potentially many times for each accessor/factory method to get a particular business object (assuming that there may be more than one business object needed to gather all data), including objects associated with in-context items. There are at least two routes that the ticker UI 702 can take in an embodiment.

First, the ticker UI 702 invokes the feed manager 706. This is done in situations when the business object contains some data (such as in-context data) that needs to be refreshed periodically during the session. The feed manager 706 receives several arguments that tell it which method in the ticker API 704 will return the business object, how frequently the feed manager 706 should poll this business logic, and the name of the ticker UI variable (a collection such as an array) that holds the properties of the business object for the ticker UI 702 components to use and display. The feed manager 706 calls the ticker API 704 immediately, and then at the intervals specified by the ticker UI 702. Second, the ticker UI 702 invokes the ticker API 704 directly. This bypasses the feed manager 706 and is done for data that only needs to be instantiated once during the session.

In yet another embodiment, for a ticker where the feed manager 706 (not the ticker API 704) knows when it is time for an update, the process can be as follows to provide updated ticker content. The ticker UI 702 calls the ticker API 704 to start a feed. The ticker API 704 calls the feed manager 706, and the feed manager 706 constructs a "callback object" that will be responsible for retrieving and dispersing information at a regular interval. The feed manager 706 will then return an empty object array to the ticker API 704, which in turn returns the empty object array to the ticker UI 702.

The feed manager 706 calls an appropriate application 708 for a business object. The application 708 will then obtain the information from an external device, such as a Java Server Page (JSP) 710—other techniques may be used to return that information. Once the information is returned, it is constructed into a business object, and the business object(s) is returned to the feed manager 706 in an array. A copy of this object array is saved in the feed manager's 706 "callback object." If this is the first return response, the feed manager 706 will return the object array to the ticker API 704, which in turn returns the object array to the ticker UI 702 to allow the ticker UI 702 to present the in-context data contained in the object array. The feed manager 706 will then call a HandleLoad function, for instance, to notify the ticker UI 702 that the information is available.

At a particular interval, the feed manager 706 calls an application 708 for new information. The business objects are returned to the feed manager 706 by the application 708 in an array, and the feed manager 706 checks that array with the saved array for different information. If the content has changed, then the feed manager 706 returns an object array to the ticker UI 702 and calls a HandleLoad function. The ticker UI 702 calls the ticker API 704 to stop a feed. The ticker API 704 calls the feed manager 706 to stop the feed, and the feed manager 706 stops the feed.

To obtain new ticker data, in an embodiment, the application(s) 708 calls the JSP 710 at a web server (which may be located at the distribution server 218). Java objects at the web server will then communicate with the database 208 to obtain the appropriate ticker information that match the IDs of the subject matter in the television program. The Java objects will then construct XML code from the ticker information obtained from the database 208, and send the XML code to the corresponding application 708. The application 708 then converts the XML code to local data objects, in one embodiment, and returns the object(s) to the ticker API 704 (or to the feed manager 706). The ticker API 704 subsequently sends the object(s) to the ticker UI 702 for display in the ticker 406.

In an embodiment, one of the applications 708 can comprise an application to determine whether it is appropriate for the ticker UI 702 to render an in-context item. Alternatively or in addition, such an application can be a separate application 712 that performs ID detection and correlation. For example, the application 712 can comprise software to detect triggers sent along with television signals, extract subject matter IDs from the triggers, and then correlate or otherwise compare the extracted IDs with known ticker content IDs. Thus, if the ID extracted from the television signal by the application 712 is ID #20A1 for "Sonics basketball," the application 712 compares this ID #20A1 to information in a database (such as the database 208), a lookup table, a data feed, or other ticker data source to determine if there is ticker content that exactly matches and is tagged with ID #20A1, or is sufficiently related (such as ID #20A for "basketball" ticker content in general or ID #20 for "sports" in general).

It is appreciated that the ticker content need not necessarily be tagged explicitly with IDs. For example, a lookup table can be provided that correlates to television subject matter IDs to ticker content subject matter (that do not have IDs). The application 712, after obtaining the IDs for the television subject matter, consults this lookup table to determine the corresponding ticker content (such as "Sonic player Smith"). Once "Smith" is identified from the lookup table, the application 712 can parse, key word search, or otherwise search through the database 208 for ticker content related to "Smith."

Once the application 712 determines that the appropriate ticker content under an ID is available (or otherwise identifies the available ticker content), the application 712 notifies the ticker API 704, which then obtains the ticker content in a manner described in the preceding paragraphs. Alternatively or in addition, the application 712 can obtain this in-context ticker content directly from the JSP 710 and database 208, and provide the obtained content to the feed manager 706 (as symbolically denoted in FIG. 7 by a broken line 716) or to the ticker API 704. Once the application 712 has identified and correlated the appropriate IDs and the appropriate in-context content has been obtained, the in-context content is propagated back to the ticker UI 702 in the manner described above for presentation to the viewer.

In an embodiment, the IDs associated with the television program can be obtained from a subject matter ID source 714. In situations where the application 712 reads triggers, the ID source 714 can comprise video streams or video signals that are accompanied by triggers having IDs. In other implementations, the ID source 714 can comprise EPG data, close-captioning data, or other data that can be used to identify the subject matter of the television program. For embodiments where the EPG data or the close-captioning data may not necessarily be explicitly provided with IDs, the application 712 can parse this data for the relevant information, such as via a key word search.

Figure 8:
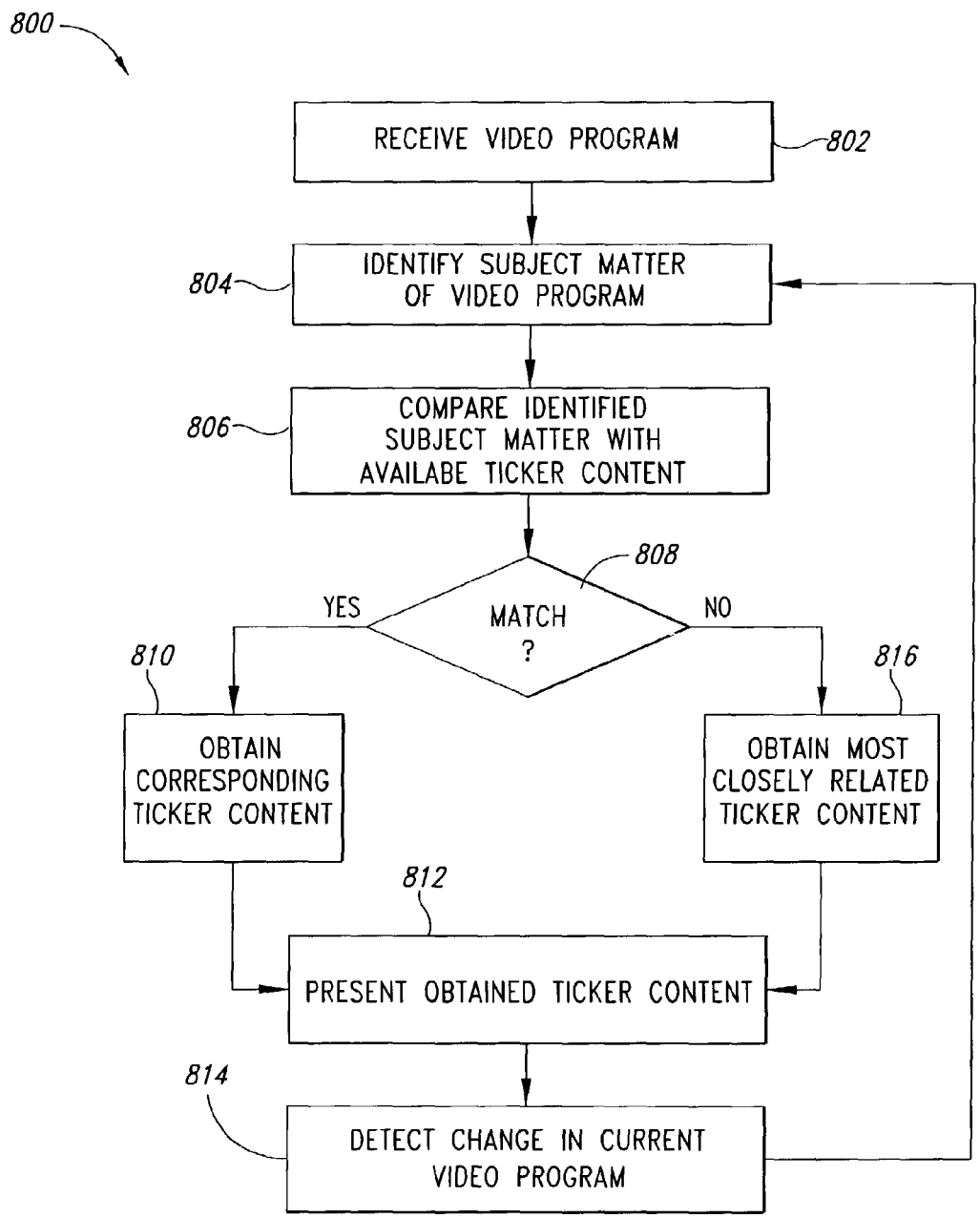
FIG. 8 is a flowchart illustrating operation of a context-sensitive ticker according to an embodiment of the invention.

FIG. 8 is a flowchart 800 illustrating operation of the context-sensitive ticker 406 according to an embodiment of the invention. Elements of the flowchart 800 may be embodied in software or other machine-readable instruction stored on a machine-readable medium, such as the storage medium 322. Moreover, operations shown in the flowchart 800 need not necessarily occur in the exact order shown.

At a block 802, a video program is received, such as a television signal that provides the television programs 404 for presentation on the display screen 402. The application 712 identifies the subject matter of the currently tuned-to video program at a block 804. As described above, this identification can be performed by examining triggers for IDs and extracting the IDs, parsing close captioning or EPG data, or via other suitable technique.

At a block 806, the application 712 compares the identified subject matter with available ticker content. Again as described above, this may be performed by comparing the extracted IDs with ticker content IDs, parsing or key word searching ticker content repositories for in-context ticker items that match the subject matter of the video program, or other suitable technique.

If there is determined to be a (substantially exact) match at a block 808, then the corresponding in-context ticker item(s) is dynamically obtained at a block 810 from sources of ticker data, such as from the database 208. This operation at the block 810 is in contrast to current tickers that are integrated along with the television signal, where the tickers are generated at a production studio prior to broadcast of the television program and with a prior knowledge of the subject matter of the television program—rather, an embodiment of the invention dynamically "pulls" data for the ticker in response to the frequently changing subject matter of television programs. The obtained in-context ticker item(s) is presented in the ticker 406 at a block 812.

If, back at the block 808, it is determined that there is no substantially exact match, then the application 712 obtains the most closely related ticker content (e.g., the "best fit") at a block 816. For example, if there are no ticker items specifically related to Sonic player "Smith," then the "best fit" ticker items that are obtained are general ticker items related to the Sonics or to basketball. The obtained "best fit" ticker items are then presented at the block 812. It is noted that if no "best fit" ticker items are identified, then one embodiment of the ticker 406 continues scrolling its current contents (whatever they may be, whether in-context or not) on the display screen 402, until new subject matter in the video program is detected that can be correlated to best fit ticker items, or until "best fit" ticker items become available for the video program subject matter.

At a block 814, the application 712 detects a change in the current video program. This change may include a change in subject matter within the same video program, interruption of the current video program by a commercial, a change in television channels, or other types of changes or combinations thereof, which results in new subject matter being presented on the display screen 402. This change can be accompanied by a new triggers, new close-captioning data, or by correlation of tuner activity to EPG data or other activity indicative of the change.

In response to the change, the application 712 identifies the new subject matter of the current video program at the block 804. The flowchart 800 then repeats as described above to locate and present ticker content that is in-context with the new subject matter.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention and can be made without deviating from the spirit and scope of the invention.

As an example, a satellite television (TV) delivery system may be implemented alternatively or in addition to a cable distribution system. A satellite TV delivery system may comprise a direct broadcast satellite (DBS) system. A DBS system may comprise a small 18-inch satellite dish (which is an antenna for receiving a satellite broadcast signal); a digital integrated receiver/decoder (IRD), which separates each channel, and decompresses and translates the digital signal so a television can show it; and a remote control. Programming for a DBS system may be distributed, for example, by multiple high-power satellites in geosynchronous orbit, each with multiple transponders. Compression (e.g., MPEG) is used to increase the amount of programming that can be transmitted in the available bandwidth.

A digital broadcast center (e.g., analogous to the head-end 106) may be used to gather programming content, ensure its digital quality, and transmit the signal up to the satellites. Programming may come to the broadcast center from content providers (TBS™, HBO™, CNN™, ESPN™, etc.) via satellite, fiber optic cable, and/or special digital tape. Satellite-delivered programming is typically immediately digitized, encrypted and uplinked to the orbiting satellites. The satellites retransmit the signal back down to every earth-station— or, in other words, every compatible DBS system receiver dish at customers' homes and businesses.

Some programs may be recorded on digital videotape in the broadcast center to be broadcast later. Before any recorded programs are viewed by customers, technicians may use post-production equipment to view and analyze each tape to ensure audio and video quality. Tapes may then be loaded into a robotic tape handling system, and playback may be triggered by a computerized signal sent from a broadcast automation system. Back-up videotape playback equipment may ensure uninterrupted transmission when appropriate.

These and other modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A set top box operable to generate a ticker for display to a user, comprising:
   a screen interface having a scroll region that can be presented on a display screen along with a video program;
   at least one item presented in the scroll region that is in-context with subject matter of the video program, wherein if the subject matter changes to a different subject matter, the scroll region presents another item that is in-context with the different subject matter and that was dynamically obtained in response to the change in subject matter; and
   at least one control to allow user interaction with the screen interface.

2. The set top box of claim 1, wherein the control comprises a center focus box into which scroll the presented items, wherein an item that has scrolled into the center focus box may be selected during the user interaction.

3. The set top box of claim 1, further comprising an identification and correlation component to identify the subject matter of the video program and to correlate the identified subject matter with items that are available to present in the scroll region.

4. The set top box of claim 3, wherein the identification and correlation component comprises part of an application to detect and process trigger information that accompanies the video program.

5. The set top box of claim 3, wherein the identification and correlation component selects an item from the available items if that item is most closely, but not exactly, matched to the identified subject matter.

6. The set top box of claim 3, further comprising:
   a ticker user interface (UI) to generate the screen interface having the scroll region that presents in-context item and to provide the control to allow user interaction with the screen interface;
   a ticker application program interface (API) in communication with the ticker UI to control presentation in-context items by the ticker UI, and in communication with the detection and correlation component to provide the in-context items to the ticker UI; and
   a feed manager in communication with the ticker API and with the detection and correlation component to determine updates to the presented in-context items.

7. An apparatus, comprising:
   at least one communication interface to receive a television signal having a video program;
   a storage medium coupled to the communication interface to store a ticker software program; and
   a processor, coupled to the storage medium and to the communication interface, to decode the video program for display to a user, to identify a first subject matter of the video program and to cooperate with the ticker software program to render an interactive ticker that presents a first item, selected from ticker data available to display in an interactive ticker, with a subject matter that is related to the identified first subject matter of the video program, wherein the first item is not pre-selected, prior to presenting the video program, for display with the video program when requested by a viewer and when there is a change in the first subject matter to a second subject matter, the interactive ticker presents a second item, from the ticker data, that is in-context with the second subject matter; wherein the processor cooperates with the ticker software to render the interactive ticker that presents the first item by:
   correlating data associated with the first subject matter to data associated with subject matter of available ticker content;
   if the correlation determines that there is a match between the data associated with the first subject matter and the data associated with the subject matter of the available ticker content, obtaining non-preselected matching ticker content; and
   presenting the non-preselected matching ticker content in the ticker as the first item.

8. The apparatus of claim 7, further comprising a detection and correlation application stored in the storage medium and in communication with the ticker software program to detect the change in the first subject matter and to correlate the second subject matter with available items to present in the ticker.

9. The apparatus of claim 8, wherein the detection and correlation application comprises an application to obtain subject matter identification information from triggers that accompany television signals received by the communication interface.

10. The apparatus of claim 8, wherein the detection and correlation application comprises an application to examine closed-captioning information that accompanies the television signal and to identify subject matter of the video program therefrom.

11. The apparatus of claim 8, wherein the detection and correlation application comprises an application to examine electronic program guide (EPG) information that is received via another communication interface and to identify subject matter of the video program from the EPG information.

12. The apparatus of claim 7, wherein if the communication interface is tuned to receive a different television signal having a different video program, there is a corresponding change to the second subject matter, and wherein the interactive ticker presents the second item that is related to the second subject matter of the different video program.

13. The apparatus of claim 7, wherein the ticker software program provides the ticker with a user interface to allow user interaction with the ticker to select a presented item.

14. A video casting system, comprising:
   a source of ticker data, the source of ticker data including:
   a feed server to receive a plurality of feeds of ticker data and having a feed engine that can manipulate the ticker data received from the feeds;
   a production server coupled to the feed server to receive the ticker data manipulated by the feed engine, and coupled to a database having tables for the manipulated ticker data received from the feed server, wherein the production server can change a format of the manipulated ticker data to a format compatible with client terminals; and
   a distribution server to distribute the manipulated ticker data having the format compatible with the client terminals;

a source of video programs, the source of video programs including at least one broadcast center to provide video programs to client terminals via a communication channel; and a client terminal communicatively coupled to the ticker data source and to the video program source, the client terminal including:

at least one communication interface to receive a video program from the video program source;

at least one communication interface to receive ticker data from the ticker data source;

a storage medium coupled to the communication interface to store a ticker software program; and a processor, coupled to the storage medium and to the communication interface, to cooperate with the ticker software program to render a context-sensitive interactive ticker that presents ticker data that is in-context with subject matter of the received video program, wherein the presented ticker data is not pre-selected for display, prior to presenting the video program, for display with the video program when requested by a viewer, wherein when there is a change in the subject matter to new subject matter, the interactive ticker presents new ticker data with a subject matter that is related to the new subject matter and that was dynamically obtained from the ticker data source in response to the change in subject matter, wherein the new ticker data is no pre-selected, prior to presenting a video program containing the new subject matter, for display with the video program containing the new subject matter when requested by a viewer;

wherein the processor cooperates with the ticker software to render the context-sensitive interactive ticker that presents the ticker data that is in-context with the subject matter of the received video program by:

correlating data associated with the subject matter of the received video program to data associated with subject matter of available ticker content;

if the correlation determines that there is a match between the data associated with the subject matter of the received video program and the data associated with the subject matter of the available ticker content, obtaining non-preselected matching ticker content; and presenting the non-preselected matching ticker content in the context-sensitive interactive ticker as a first item of the ticker data.

15. The system of claim 14, wherein the broadcast center comprises part of an interactive television network.

16. The system of claim 14, wherein the broadcast center comprises part of a satellite television delivery system.

17. The system of claim 14, wherein the video programs provided by the video program source are accompanied by identification information that identify subject matter of the video programs, wherein the ticker software program in cooperation with the processor use the identification information to compare the subject matter of any received video program to ticker data available from the database to select in-context ticker data.

18. The system of claim 14, wherein the video programs provided by the video program source are accompanied by identification information that identify subject matter of the video programs, wherein the ticker data stored in the database are identified with similar identification information, and wherein the ticker software program in cooperation with the processor compare the identification information from any received video program to the identification information of the stored ticker data in the database to select in-context ticker data.

19. The system of claim 14, wherein the ticker software program provides the ticker with a user interface to allow user interaction with the ticker.

\* \* \* \* \*